United States Patent
Umebayashi

(10) Patent No.: US 6,839,147 B1
(45) Date of Patent: Jan. 4, 2005

(54) ELECTRONIC EQUIPMENT CONTROL SYSTEM BY COMMUNICATION PROTOCOL

(75) Inventor: Akito Umebayashi, Kanagawa-ken (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 559 days.

(21) Appl. No.: 09/584,688

(22) Filed: Jun. 1, 2000

(30) Foreign Application Priority Data

Jun. 16, 1999 (JP) .......................................... 11-169128

(51) Int. Cl.$^7$ ............................................. G06K 15/02
(52) U.S. Cl. .................... 358/1.15; 358/1.13; 358/1.14; 709/206; 709/202; 709/205; 709/217
(58) Field of Search .............................. 358/1.13–1.15, 358/448, 468; 709/202, 203, 205, 217; 702/5; 710/5, 24

(56) References Cited

U.S. PATENT DOCUMENTS

| | | | | |
|---|---|---|---|---|
| 5,568,487 A | * | 10/1996 | Sitbon et al. ................ | 370/466 |
| 5,720,015 A | * | 2/1998 | Martin et al. ............... | 358/1.15 |
| 6,233,618 B1 | * | 5/2001 | Shannon ...................... | 709/229 |
| 6,272,547 B1 | * | 8/2001 | McWilliams ................ | 709/232 |
| 6,286,137 B1 | * | 9/2001 | Bleizeffer et al. ............ | 717/127 |
| 6,292,267 B1 | * | 9/2001 | Mori et al. ................. | 358/1.15 |
| 6,369,909 B1 | * | 4/2002 | Shima ....................... | 358/1.15 |
| 6,421,610 B1 | * | 7/2002 | Carroll et al. ................. | 702/5 |
| 6,466,328 B1 | * | 10/2002 | Bradley et al. ............. | 358/1.15 |
| 6,567,180 B1 | * | 5/2003 | Kageyama et al. ......... | 358/1.15 |
| 6,571,285 B1 | * | 5/2003 | Groath et al. ............... | 709/223 |

FOREIGN PATENT DOCUMENTS

| | | | |
|---|---|---|---|
| JP | 07105069 | | 4/1995 |
| JP | 08234934 | | 9/1996 |
| JP | 09006558 | * | 1/1997 |

* cited by examiner

*Primary Examiner*—Shabana Qureshi
(74) *Attorney, Agent, or Firm*—McDermott Will & Emery LLP

(57) ABSTRACT

A network system for control of the image inputting and outputting apparatus using FTP, one of the most common communication protocols among TCP/IP, which has now become a network connection standard.

The prior art network system requires complicated procedures. When the image inputting apparatus on the network is controlled by FTP, a processing method has to be set for each operation, because FTP itself is not equipped with a command for control of the image inputting and outputting apparatus. To solve this problem, the network system according to the present invention is provided with command interpretation means that interprets a specific FTP and a specific character string written on the file name field of said command and generates a control instruction to image inputting and outputting means.

13 Claims, 2 Drawing Sheets

```
[Print]
Format = Tiff/MMR
Number = 2
Startpage = 1
Endpage = 3
Output = A4
Orientation = Portrait
```

FIG. 3

```
[IMAGES]
ImageID = 0232
Size = 124kbytes
Pages = 2
Access = Owner
ImageID = 0234
Size = 254kbytes
Pages = 5
Access = Public
```

FIG. 2

ELECTRONIC EQUIPMENT CONTROL SYSTEM BY COMMUNICATION PROTOCOL

BACKGROUND OF THE INVENTION

1. Field of the Invention

The present invention relates to a network system to control electronic equipment by file transfer protocol, especially image data inputting and outputting apparatuses such as digital multifunction apparatus.

2. Description of the Prior Art

The spread of networks has led to increased use of such networks by computers like work station computers and personal computers and also such equipment as network printer directly connected to the network. Communication through the network requires common standards or rules communication protocol—that are applied to the sender and the receiver. And especially, communication equipment has to be adapted to standard communication protocols. A communication protocol LPR for printing is used where the standard protocol for internet—TCP/IP—is utilized. However, LPR is originally a UNIX-type communication protocol and it is often the case that non-UNIX-type computer OS is not adapted to the protocol.

Meanwhile, the file transfer protocol (FTP) is one of the oldest communication protocols among the internet protocols. Its transfer application is provided as standard on almost all the operating systems (OS). If, therefore, FTP is made a common communication protocol between the network printer and the computer system, it can be hoped to build a printing environment applicable to any client OS.

It is so arranged that in order that a file to be received or sent by FTP, the file name is added after the, send/receive command as, for example, "RETR xxxx." RETR is taken as command and xxxx is interpreted as file name. That is, the code says, "Retrieve a file named xxxx." Thus, the file name is specified and the corresponding file is transferred in the FTP mode. But there is provided no command to control the operation of the printer or the like. Various methods are employed to control the operation of the printer or the like through the network.

For example, a method is disclosed in unexamined Japanese patent application No. 8-234934. In this technique, the operations required are sorted out according to the user identification (ID) logged in. In case a user wants a print, the command used in FTP is applied for control of the printer, thus bringing about a network printing setup.

Another example is described in unexamined Japanese patent application No. 9-6558. That discloses a method in which a printer status is outputted as pseudo file to a printer having a file system by LIST command of FTP.

A further example is a technique disclosed in unexamined Japanese patent application No. 7-105069. In this patent application, there is provided a scanner server. When an image data is taken from the network scanner, it sees to the client that the image data is taken from the file system.

However, the prior art image data inputting and outputting apparatus using FTP has some problems.

The method disclosed in unexamined Japanese patent application No. 8-234934 presents this problem. Operations are sorted out according to the user ID logged in as mentioned above. That makes the user management complicated.

The file system disclosed in unexamined Japanese patent application No. 9-6558 is to temporarily store inputted image data after all. It is impossible to do printing or the like after retrieving any image data accumulated in the printing apparatus, for example.

The method according to the unexamined Japanese patent application No. 7-105069 involves complicated procedures. For scanning starts after a request for retrieval is issued. That makes connection from the client difficult which times out in a specific time.

It is also pointed out that any of those techniques or methods is a solution only to a specific operation of the printer or scanner and not universally applicable to various operations as of the digital multifunction apparatus.

SUMMARY OF THE INVENTION

In view of the prior art described above, including the disadvantages and deficiencies of the prior art, it is an object of the present invention to provide a network system for control of the image inputting and outputting apparatus using FTP, one of the most common communication protocols among TCP/IP, which is now a standard in the network connection.

To achieve the foregoing object, the present embodiment adopts the following means.

There is first provided command interpretation means that interprets a specific command for FTP and a specific character string written on the file name field in the command and generates an instruction to the image data inputting and outputting apparatus. To be specific, in case the character string begins with "#," the command interpretation means interprets the command and this character string and generates an instruction to the image data inputting and outputting apparatus for a specific operation. Other cases than that are treated as usual FTP command. The idea is to utilize the finding that there are few operating systems mounted with a file system to accept file names beginning with "#." The character string beginning with "#" is given in the following syntax form:

"# (command)=(parameter) & (command)=(parameter) & . . . "

There is provided another means—job ID issuing means—to issue a job ID for each operation of the aforesaid image data inputting and outputting apparatus according to the instruction generated above.

Still another means is provided. The means is to inform the client of each operation status of the aforesaid image data inputting and outputting apparatus.

That arrangement permits one-mode instructions for different operations of the image data inputting and outputting apparatus on the network using FTP and also permits checking of the operation status.

BRIEF DESCRIPTION OF THE DRAWINGS

Preferred embodiments of the present invention will be illustrated in conjunction with the accompanying drawings, in which:

FIG. 2 is an example of the image data attribute list.

FIG. 3 is an example of the print parameter file.

DESCRIPTION OF THE PREFERRED EMBODIMENTS

Figure 1:
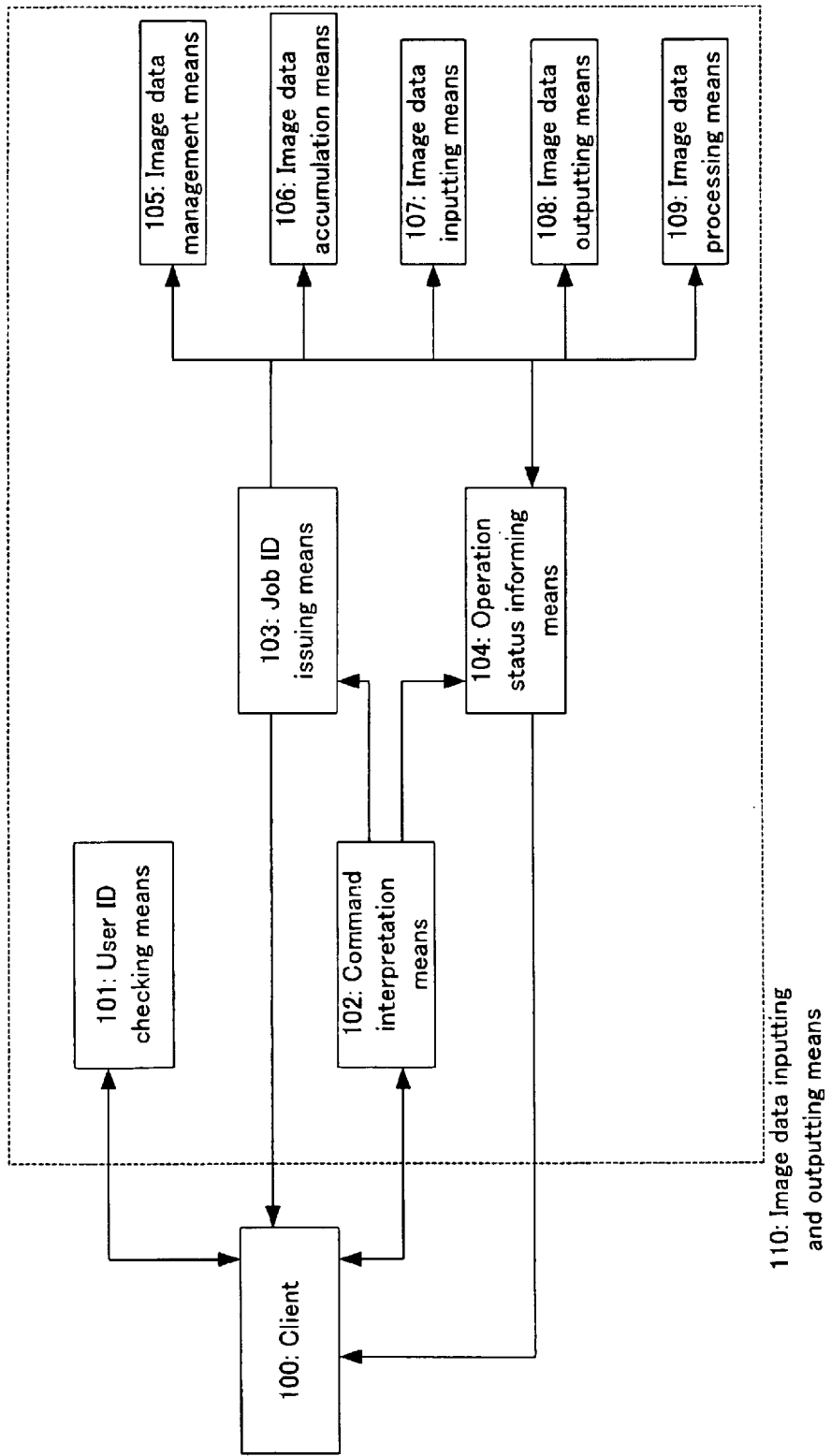
FIG. 1 is a block diagram of the network system according to the present invention.

FIG. 1 is a block diagram of the network system according to the present invention. In this example, the image data inputting and outputting apparatus 110 is provided with command interpretation means 102, job ID issuing means 103, operation status informing means 104 and user ID means 101, all within the image data inputting and outputting apparatus 110. Image data within this image data inputting and outputting apparatus 110 are managed by image data management means 105 on the basis of image ID's and user ID's.

Under that setup, a client 100 or user first sends a request for connection to the image data inputting and outputting apparatus 110. Receiving this request, user identification means 101 sends back a user ID request to the user. Receiving the user ID request, the user sends the user name to user identification means 101. Then, user identification means 101 sends back a password request to the user. If the user sends the password, user identification means 101 checks the user ID and authenticates the password. And the image data inputting and outputting apparatus 110 is now ready to accept a command. The user begins to send a command and a file name by FTP.

There will now be described examples of interpretations by command interpretation means 102.

The present embodiment of the invention uses three commands—a command "RETR" for retrieval of files by FTP, a command "STOR" to send out a file, and a command "LIST" to display the file name. In case the character string written on the file name field of those commands begins with "#," command interpretation means 102 interprets the command and the character string.

Under such an arrangement, the user sends a command and a character string "RETR #FILE=IDLIST," for example. Then, command interpretation means 102 prepares an attribute list of image data—to which the user has access right—out of the image data within the image data inputting and outputting apparatus 110, and generates an instruction to send the list to the user and sends out the instruction to image data management means 105. According to this instruction, image data management means 105 sends to the user a list as shown in FIG. 2. In FIG. 2, [IMAGES] is a header, while Image ID indicates an image ID, Size the size of the image data, Pages the number of pages, and Access the access right set in the image data.

If the user send a command and a character string like "LIST #COMMAND=PRINT&IMAGEID=0234," command interpretation means 102 generates an instruction to image data outputting means 108 to print out an image data with an image ID "0234." According to this instruction, image data management means 105 checks to see if this image data is found within the image data inputting and outputting apparatus 110. If the data is not found, an error message is sent to the user. If the data is found, the image data management means 105 checks if the user has access right to this image data. If the user has no access right, an error message is sent back. If the user is found to have access right, image data outputting means 108 prints out the image data. And after printing, the usual LIST command response is returned. In case printing fails because of trouble with image data outputting means 108, stalling of feeding paper or the like, an error message is sent back as usual LIST command response the same way.

It is noted that the file name character string is not limited to the above example. The character string may contain such information as the number of pages to be printed, setting of the form and image processing method such as dither.

Also, if the user sends a command and a character string "RETR #COMMAND=IQUIRE&IMAGEID=0234" so as to monitor whether the printing is successful, command interpretation means 102 generates an instruction to send to the user a message on the processing of the image data with an image ID "0234," and sends out the same to operation status informing means 104. According to this instruction, operation status informing means 104 sends to the user a message indicating whether the printing by image data outputting means 108 is successful. Monitoring may be effected by status acquisition protocol like SNMP, a network management tool.

Also, if the user sends a command and a character string consisting of "RETR #IMAGEID=0234," command interpretation means 102 generates an instruction to transfer the image data with an image ID "0234" to the user and sends the same to image data management means 105. According to this instruction, image data management means 105 checks the presence of the image data and the access right of the user as in the printing example described above. In case this image data is not present, or in case the user has no access right even if the image data is found, an error message is sent back to the user. In case the image data is present and the user is found to have access right, image data management means 105 transfers this image data to the user. As shown, it is also possible for the client to retrieve an image data from image data inputting and outputting apparatus 110 and to process the data himself.

Meanwhile, an image data newly created by the client 100 can be transferred to image data inputting and outputting apparatus 110 and printed by image data outputting means image data outputting means 108. Since this image data is given no image ID yet, the following procedure is taken using the job ID.

First, the user sends a command and a character string "LIST #COMMAND=PRINT&STATUS=NEW." Then, command interpretation means 102 issues a new job ID and generates an instruction to send the same to the user, and sends the instruction to job ID issuing means job ID issuing means 103. According to the instruction, job ID issuing means 103 sends to the user a job ID, "11111," for example.

Then, the user sends to image data inputting and outputting apparatus 110 a print parameter-specifying file as shown in FIG. 3, for example, by "STOR #DOCUMENT=TICKET&JOBID=11111." The user sends to image data inputting and outputting apparatus 110 an image data according to the job ID="11111" by "STOR #DOCUMENT=IMAGE&JOBID=11111". In addition, the user sends a command and a character string "LIST #DOCUMENT=PRINT&JOBID=11111". Then, command interpretation means 102 generates an instruction to print out the image data and sends out the same to image data outputting means 108. According to this instruction, image data outputting means 108 prints out the image data. The procedures after the printing are the same as described above.

It is noted that instead of sending a print parameter-specifying file, it is possible to include the specifying of the number of copies, setting the printing form, image processing method such as dither in the character string specified in FIG. 2.

It is also possible to include specifications of filing for printing (1200DPI.JBIG compact), browsing (400DPI.MMR compact), for thumbnail or the like in the print parameter-specifying file in FIG. 4 or the character string specified in FIG. 3.

Furthermore, the FTP command and the character string written on the file name field to be interpreted by command interpretation means 102 are not limited to the aforesaid example. They may be added as needed for operation of the image data inputting and outputting apparatus 110. Even if the image data management means 105 is a relational data base management system, for example, the operation of the image data inputting and outputting apparatus 110 can be specified by adding the aforesaid command and a character string written on the file name field corresponding to the relational data base control command.

As set forth above, there is provided command interpretation means that interprets the FTP command and the character string written on the file name field as instruction to the image data inputting and outputting apparatus. If the network system of the present invention is applied to the digital marutifunction apparatus, for example, all the operations can be addressed in one mode including common use of scanner and direct image printing, thus saving space. Also, the digital marutifunction apparatus can be used remotely as simplified filing system. Another point to be noted is that even if the client is not equipped with an extension FTP command, the function of the image data inputting and outputting apparatus can be utilized by minimum command required for FTP.

What is claimed is:

1. A network system connectable to a remote client and electronic equipment, said system comprising:

command interpretation means for interpreting a file transfer protocol command received via communication protocol from said client as a command for file transfer protocol operation and for recognizing a specific character string in a file name field of the file transfer protocol command as an instruction command for a specific operation; and control signal generating means, responsive to recognition by said command interpretation means of the specific character string in the file name field of said file transfer protocol command for generating a control instruction for a specific operation of said electronic equipment.

2. The network system as defined in claim 1 wherein said communication protocol is a file transfer protocol.

3. The network system as defined in claim 1 wherein said communication protocol is a hyper text transfer protocol.

4. The network system as defined in claim 1 further comprising job ID issuing means that issues a job ID to said electronic equipment according to said control instruction.

5. The network system as defined in claim 1 further comprising operation status informing means that informs the client of each operation status of said electronic equipment according to said control instruction.

6. The network system as defined in claim 1 further comprising user ID checking means that checks the individual user ID given to each user at the client.

7. The network system as defined in claim 1 wherein said electronic equipment is provided with image data accumulation means to accumulate image data.

8. The network system as defined in claim 1 wherein said electronic equipment is provided with image data inputting means that optically reads original images and generates image data.

9. The network system as defined in claim 1 wherein said electronic equipment is provided with image data processing means that processes image data.

10. The network system as defined in claim 1 wherein said electronic equipment is provided with image outputting means that outputs image data to recording media.

11. The network system as defined in claim 1 wherein said electronic equipment is provided with image data management means that manages image data by giving an image ID to said image data.

12. The network system as defined in claim 11 wherein said electronic equipment is provided with said image data management means that manages image data according to said image ID and individual user ID given to each user at the client.

13. The network system as defined in claim 11 wherein said image data management means is a relational data base system.

* * * * *